United States Patent [19]
Hagstrom et al.

[11] Patent Number: 5,927,208
[45] Date of Patent: Jul. 27, 1999

[54] CD PRINTER CENTERING ADJUSTMENT

[75] Inventors: Erick Hagstrom, Hamel; Robert E. Francis, Richfield, both of Minn.

[73] Assignee: Primera Technology, Inc., Plymouth, Minn.

[21] Appl. No.: 09/002,268

[22] Filed: Dec. 31, 1997

[51] Int. Cl.[6] ...................................................... B41L 3/02
[52] U.S. Cl. ........................................... 101/486; 101/35
[58] Field of Search ............................... 101/35, 41, 484, 101/485, 486; 33/614, 620, 621

[56] References Cited

U.S. PATENT DOCUMENTS

| | | | |
|---|---|---|---|
| 5,542,768 | 8/1996 | Rother et al. | 400/120.16 |
| 5,560,297 | 10/1996 | Ford | 101/486 |
| 5,699,742 | 12/1997 | Ahrens et al. | 101/486 |
| 5,752,446 | 5/1998 | Squibb | 101/486 |

Primary Examiner—Ren Yan
Attorney, Agent, or Firm—Westman, Champlin & Kelly, P.A.

[57] ABSTRACT

A CD printer for printing labels on compact discs print information on a CD centered on a print program center. A support for the CD is movable in one axis. The printer moves on a perpendicular axis. The axis forms a plane parallel to the plane of the disc. The CD may be centered selective to the printer program by printing on the disc a first series of lines that are radially spaced and extend from the CD center along both of the axes, and then rotating the CD 180° and printing a second set of lines which are radially spaced along each of the axes but are spaced a radial distance less than the lines printed in the first printing. A vernier is established and where the lines align, the amount of offset from a centered position is indicated. Offset can be corrected by moving the tray and print head on its mounting in the respective directions to a new zero position indicated by the vernier display. The CD is held in a repeatable position on its tray through the use of a three-point contact arrangement that engages the edges of the discs at three locations.

12 Claims, 5 Drawing Sheets

CD PRINTER CENTERING ADJUSTMENT

BACKGROUND OF THE INVENTION

The present invention relates to a printer for labels on a flat object, such as a compact disc (CD) which can be set to ensure that the disc being held is centered relative to the printing program for the label which is to be printed. This ensures that the label is properly positioned when printed.

Various printers for printing information onto CDs have been advanced. Ink jet printers or similar-type printers are now used for printing information on the CD in the center area. The labels will be printed eccentrically, or off-center, unless the CD and the CD tray or carriage is centered relative to the center reference of the printing program. The printing proceeds under programmed control and the center reference of the printing program for the print head must be coincidental with the center of the CD itself. Adjustments normally can be done by manually adjusting the CD in two mutually perpendicular directions in the plane of the CD. The present invention provides a way of ensuring very rapid centering for the CDs that are being printed.

SUMMARY OF THE INVENTION

The present invention relates to a printer for labels on discs or other printable items that are printed in sequence using movement in at least one direction. A printer travels in one direction, and prints on a disc or card that is held in a tray or carriage which as disclosed moves in a second mutually perpendicular direction under the print head so that the printed material can be applied to a surface of the item. A calibration item (disc or card) is mounted on the carriage or tray, and the print head is programmed to print a series of spaced parallel lines in at least one radial column or row 90° apart preferably the series of lines are printed in at least two rows. The printed lines are perpendicular to radial lines (X–Y axes of the printer) passing through the center of the item. The item is removed and rotated 180° about its center axis. The printer then prints at least one more row of spaced parallel lines, which are adjacent the lines in the row or rows of lines first printed. The first set of lines for example is spaced 0.18 of an inch apart, but the second set of lines will be printed differently spaced, for example 0.02 inches closer together, (spaced 0.16 inches apart). This forms a vernier scale which will indicate the amount that the item is offset from centering on the center of the printing program.

If the calibration item, such as a CD is not centered on the center of the printing (a zero point) the adjacent lines of the respective rows of printed lines will not meet at the "0" position. The amount of offset along the axes of printing will be indicated where a line of a row of the second printing aligns with or touches a line of an adjacent row of the first printing. In the form disclosed, both the printer and the carriage are driven on their respective axes by high resolution stepper motors, so the motors can be stepped to place the printer head at zero laterally (Y axis) and the tray or carriage for the item can be moved along its axis (Y axis) until centered with the center of the print program. Thus the change that is required for centering the item along each of the mutually perpendicular axes lying in the plane of the movement of the item can be accomplished. The arrangement has special applicability to generally flat, disc like items, such as compact discs.

The calibration CD disclosed is supported on the tray at three points, on its periphery so it is held in a repeatable location on the tray. Once the tray is properly positioned, each CD will be held in proper position. The arrangement works for flat rectangular cards also.

DETAILED DESCRIPTION OF THE PREFERRED EMBODIMENTS

A standard ink jet CD (compact disc) label printer indicated generally at 10 is provided with a mounting frame 12 and a housing. The printer has a support tray or carriage 14 which has side walls 16 to permit the tray to be slid from its position shown in FIG. 1 outside of the frame or housing 12 to a position on the interior of the frame wherein a printable item such as a flat card or CD on the tray is under a print head in position for printing.

The tray 14 has a center panel 18 that has circular depression 20 in the center that is of size to receive a calibration disc indicated at 22. The depression has a pair of annularly spaced fixed disc edge contact points 24 that are at the periphery of the depression and protrude into the depression 20, and a third spring loaded disc contact member comprising a lever 26 that is mounted on a pivot pin 28. The pivot pin 28 extends downward from panel 18, so the lever 26 is carried on the tray. The opposite end of the lever 26 from pivot 28 is spring loaded toward the depression 20 and a disc comprising a calibration CD 22 with a spring 23 that has one end hooked to the lever and the other end extending forward and attached to the tray 20. The lever 26 has an edge projection 26A that engages the edge of the calibration CD 22 so that the CD is held in the depression 20 at three separated points around its periphery for holding it in a known, repeatable position in the depression 20. The centering achieved can be used for any printable item, particularly one which is flat. The term CD will be used for purposes of disclosure, but not limitation. Rectangular cards also work.

Figure 3:
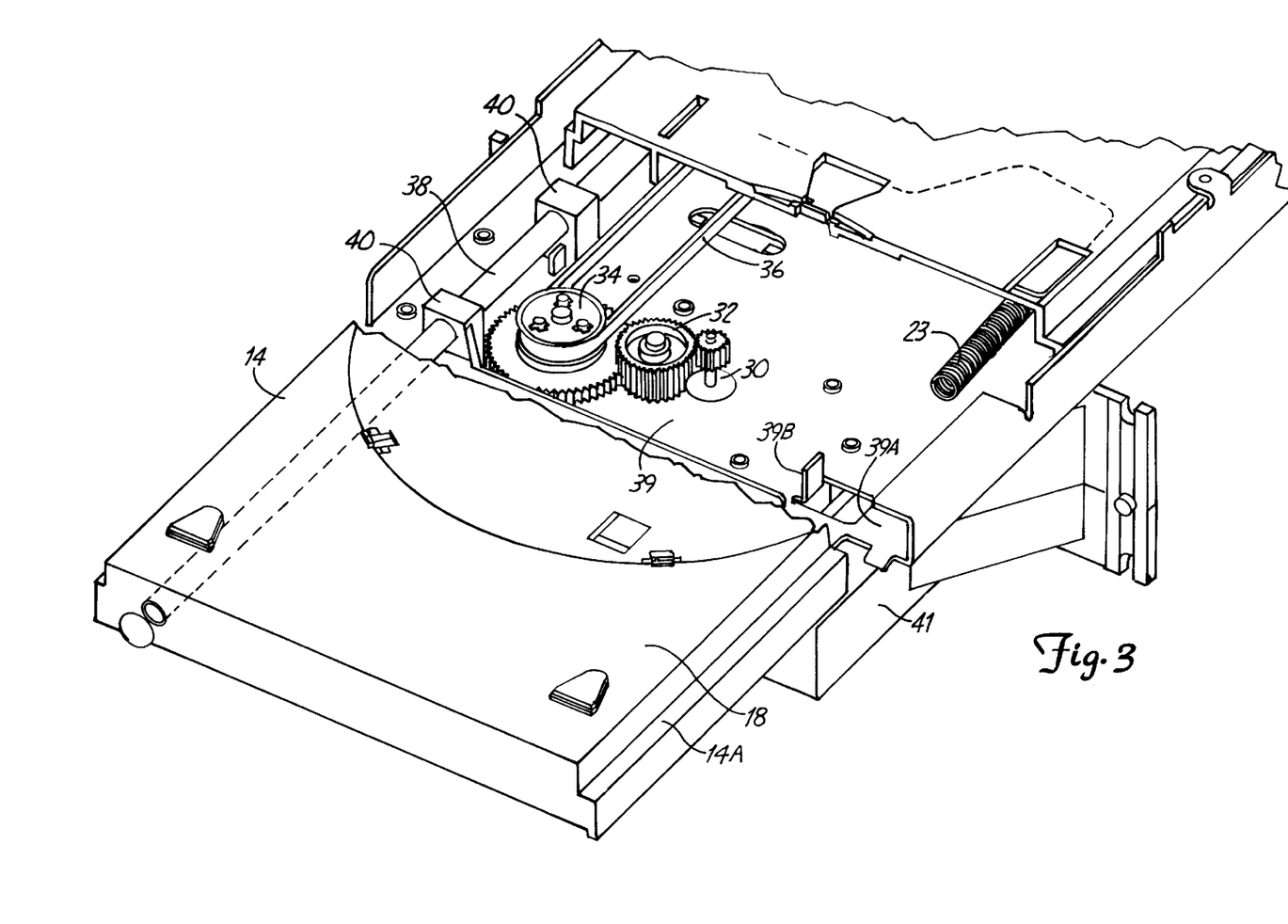
FIG. 3 is a perspective view of the mounting frame viewed from an opposite side from FIG. 1, with parts broken away.

The tray 14 is driven in and out of the housing or frame along a Y axis through the use of a fore-and-aft drive stepper motor 30 operating through a gear set 32 to drive a drive pulley 34 that drives a belt 36. The belt 36 has its opposite end mounted on a pulley supported on the frame 12 in a conventional manner. The tray 14 has a rod 38 fixed to it under the center panel along one side and the rod 38 is slidably mounted in mounted in suitable bearings 40. The rod 38 extends along the full length of the tray 14 and is held in end walls of the tray. The bearings 40 are supported on a block 41 forming a part of the mounting frame (see FIG. 3).

The mounting frame 12 has a support plate 39 that is mounted on block 41 and the support plate 39 supports the stepper motor 30 and the gear set 32, as well as the pulleys for the belt 36. The edge of the support plate opposite from the rod 38 is formed to provide a channel 39A that receives and slidably guides the stepped edge 14A of the tray 14 as the tray slides in and out.

Figure 1:
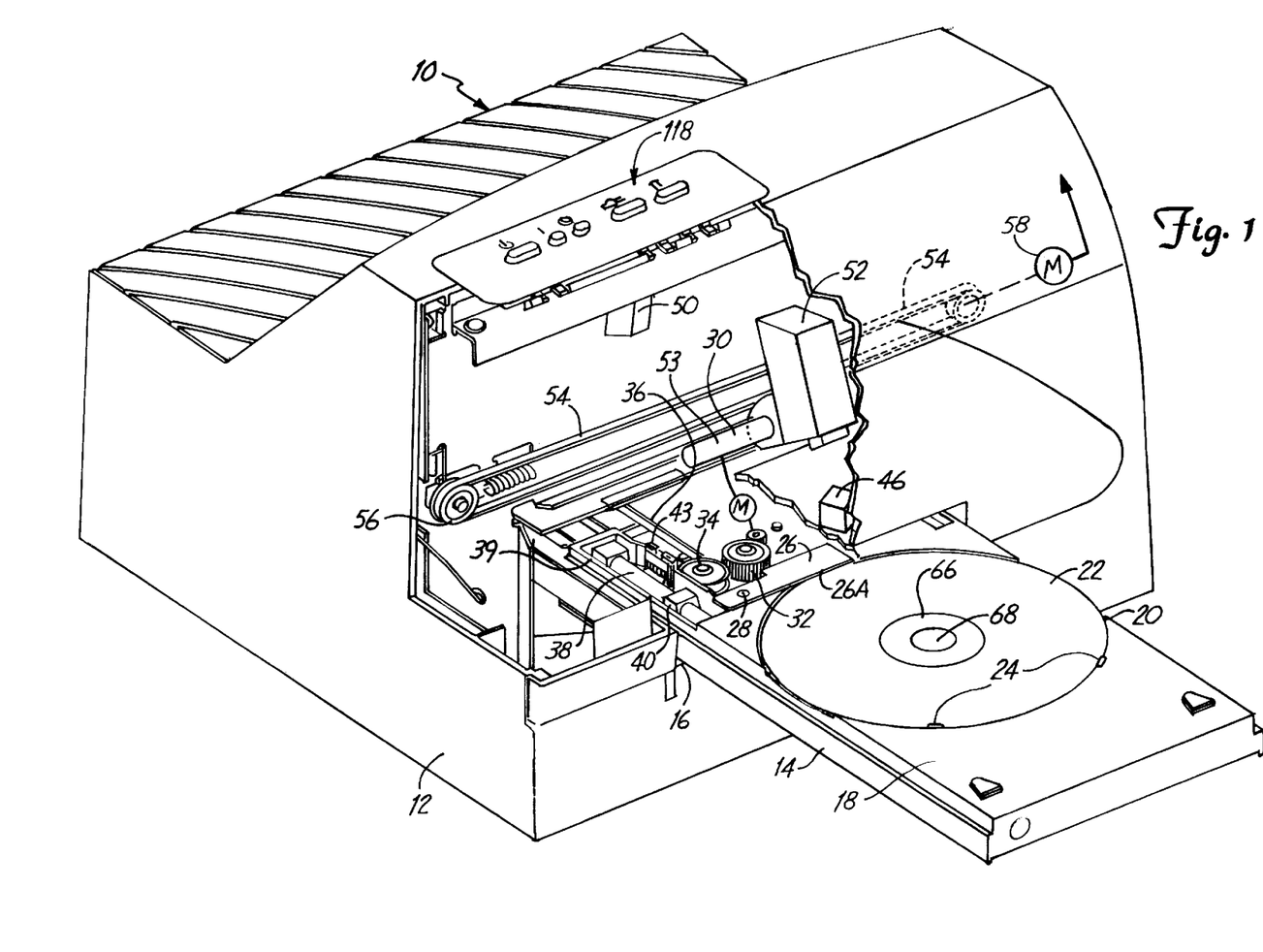
FIG. 1 is a perspective view of a CD printer having a CD tray or carriage in an extended or open position with parts broken away.
Figure 2:
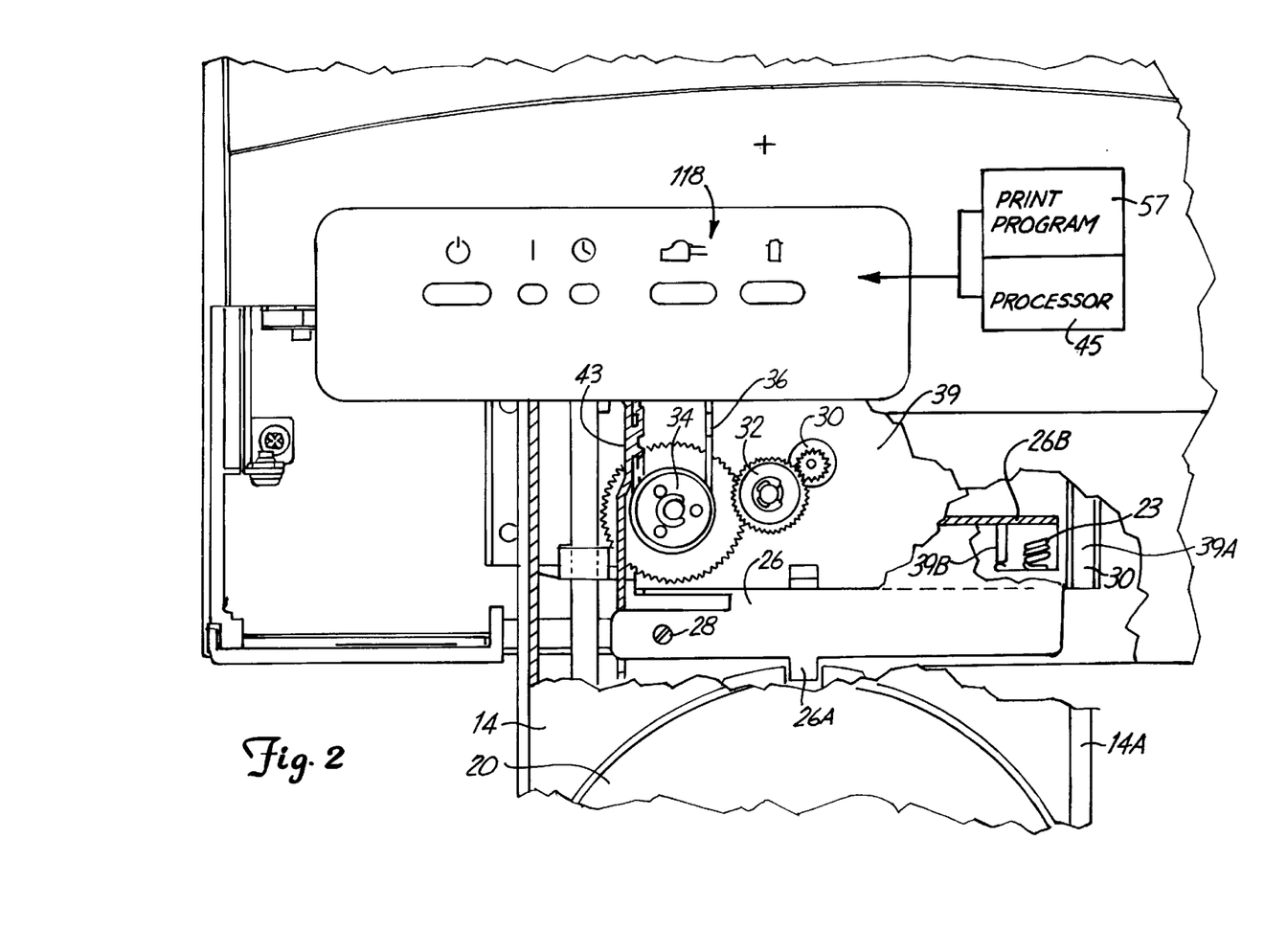
FIG. 2 is a fragmentary enlarged top plan view of the printer of FIG. 1 with parts broken away.

The tray 14 is driven by a connection between a wall 43 that depends from the tray and the belt 46, the wall 43 is shown in FIGS. 1 and 2, where platform 18 is broken away. Since the tray 14 is slidably mounted, driving the stepper motor 30 and the gear set, will drive the belt 36 and the tray will slide in and out. The stepper motor 30 controls the movement of the tray between its retracted position where a CD on the tray is under a print head shown schematically at 52 and its open position. The stepper motor 30 will respond to commands to move the tray 14 from a control processor. The control for full in or full out can be a switch, or part of the control program. The movement during printing is from a print program. The driving of the stepper motor 30 also will be used for centering the CD on the tray 14 relative to the center of printing by the print head 52 as will be described. The stepper motor 30 can be precisely controlled. There is a "tray out" sensor 46 at the front of the printer cabinet that indicates when the tray 14 is not in its position for printing, and a "tray in" sensor on the interior of the machine shown schematically at 50 is for sensing when the tray 14 is in its home position and printing can be carried out.

The lever 26 is loaded with a spring 23 that is held at one end on the tray so the centering member 26A gently engages the peripheral edge of a CD in the depression on the tray and urges it to a selected position against contact points 24. The centering member 26A is released from the edge of the CD when tray 14 is fully opened. The lever has a depending wall 26B, shown in FIG. 2 where the top of the lever is broken away. The depending wall engages an upright lug 39B when the tray open fully, and causes the lever to pivot enough against the spring action to release the CD.

Print head 52 is conventional and is mounted on a lateral slide rod 53, (lateral or X axis). Movement is controlled by a belt 54 that is mounted on suitable pulleys 56 and is driven from a stepper motor 58.

The print head 52 is positioned and controlled so that it will print on the center label portion of a CD. An area indicated at 66 (FIG. 1) is a typical location for printing. In order to ensure that the printed material is centered relative to the axis of central opening 68 of the CD (the center of the CD), a test pattern is printed on the calibration CD 22 initially, using the printer stepper motor 58 to drive for lateral movement (X axis) and using the gear train 32, pulleys 34, belt 36 and stepper motor 30 for moving the tray 14 in fore-and-aft directions (Y axis). For convenience, the lateral movement can be called horizontal or X axis movement, and the in-and-out movement, or fore-and-aft movement called vertical or Y axis movement.

When a calibration CD 22 is placed in the depression 20 of tray 14 and the tray is closed, the CD is held by the spring load at three contact points, and the calibration CD moves under the print head 52 in position for printing. The printing program represented at 57 which is a software program, controls the stepper motors 30 and 58 as well as the printing of the print head to move the print head and the tray 14 for printing the desired text on the calibration CD 22. The calibration CD has a printable surface across its entire top side, that is, the side that is presented to the print head. The print program operates along mutually perpendicular axes defined by guide rod 38 for the tray and rod 53 for the print head. The calibration CD 22 shown in FIG. 4 has the in-and-out or Y axis (rod 38) indicated at 86 and the lateral or X axis (rod 53) indicated at 79.

Figure 4:
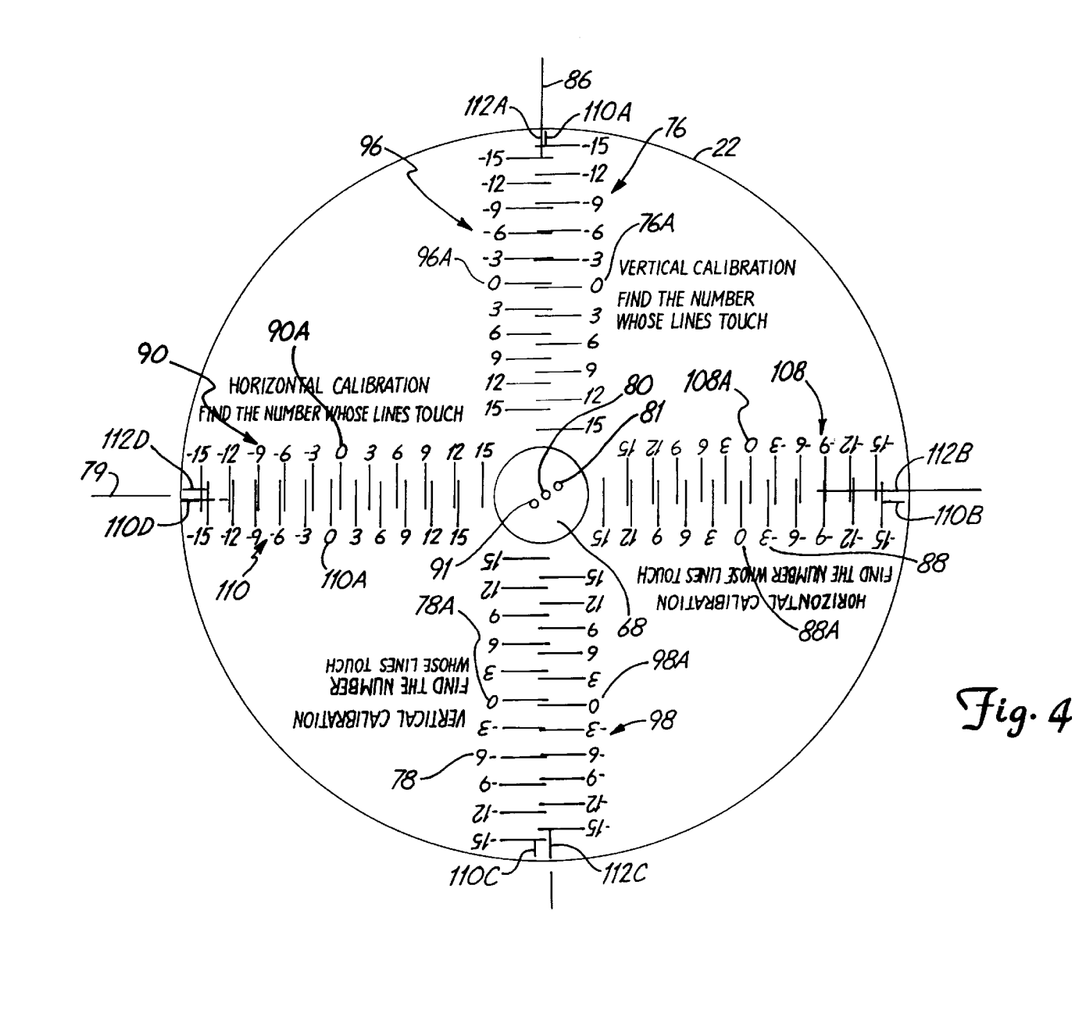
FIG. 4 is a plan view of a reference CD showing both of the alignment indicators printed in place on the CD and to illustrate the centering of the vernier-type printing.

The print program center for an initial printing is indicated at 81, which, as shown, is offset or eccentric relative to the center 80 of the CD 22. This means that the center of printing and the center of the CD are not matched and the label to be printed will be printed off center, if this is not corrected.

A vernier printing arrangement is used for checking and correcting the centering of the print program with the center of the CD. A series forming a row of spaced, parallel lines are printed perpendicular to each of the mutually perpendicular axes 79, 86, which pass through the center of the CD. In actuality the CD is shifted for alignment, but for explanation purposes having the mutually perpendicular axes passing through the center of the CD is illustrative.

As shown in FIG. 4, a first printing, comprising a series of radially spaced lines 76 forming a radial row or set that are printed in direction along the Y axis 86 and, as shown, offset in positive X direction from the Y axis 86. A series of radially spaced lines 78 forming a row or set is also printed out in direction of the Y axis 86, on an opposite side of the opening 68 from lines 76, and offset from axis 86 in a negative X direction. The lines of both sets are spaced a known, selected distance apart and are perpendicular to the Y axis 86. For example, the lines 76 and 78 can be spaced 0.2 inches apart and are numbered with numbers that are selected arbitrarily from a "0" position, but which are related to the steps of the stepper motor 30 so that corrections can be inputted easily. As shown, there is a line in each series that is designated "0", and indicated as 76A and 78A. The next adjacent lines are labeled +3 and −3. The lines are all numbered.

Identical sets of lines are also printed out in rows extending along X axis 79. The sets of lines are indicated at 88 and 90, respectively, on opposite sides of the center opening 68 of the CD. The row or set of lines 88 are offset from the X axis in negative Y direction and the row or set of lines 90 is offset from the X axis in positive Y direction. The lines 88 and 90 are also spaced the same distance apart (for example, 0.2 inches) as the lines 76, 78. The lines 88 and 90 are also numbered from a "0" position indicated at 88A and 90A with positive and negative numerals extending in each direction from the zero mark.

As the spaced line sets 76, 78, 88, 90 are all printed, they are positioned centered on the print program center 81. As stated this center is offset from the CD center 80. The calibration CD is then manually removed from the tray 14 and rotated 180°, and a second printing of sets of spaced lines and numerals are printed in place. The second sets of lines are offset from and parallel to the previous sets of lines and extend in both directions along the respective axes 79 and 86. In FIG. 4, since both the first and second printings are shown completed, in the first printing set 78 would have been above the X axis and set 76 below. The center of the printing program, which is the same as far as the print head and tray controls are concerned, is now is shown at 91 in FIG. 5. The spacing of the lines in the second printing is in this example is different from the line spacing in the first printing. For example the spacing can be 0.02 inches less than the 0.2-inch spacing of the first printed line sets, making the second sets of numbers and lines a vernier indicator of offset from center along two axes, and thus indicating needed correction for eccentricity. Lines 96 are along the in-and-out or Y axis and are printed adjacent to but laterally offset from the lines 76. The lines 96 are numbered in like manner from a zero mark 96A. On the opposite side of the center point 80, a set of spaced, parallel lines 98 is printed, with the zero mark 98A with numerals provided along the lines in opposite directions from the center or zero mark. The lines 98 are adjacent to the lines 78.

Likewise, along the lateral or X axis 79, a set of lines 108 is printed adjacent lines 88, with the spacing as shown 0.02 inches less than the spacing of the lines 88, and on an opposite side of the axis 70 from the lines 88. A zero point 108A is printed, and because of the narrow spacing, the lines 108 act as a vernier relative to the lines 88.

An additional set of spaced lines 110 are printed on an opposite side of the center 80 from the lines 108, along axis 79, and these are referenced to a zero point 110A. The lines 110 are adjacent and on an opposite side of axis 79 from lines 90.

When it is determined where the respective lines of adjacent sets align or touch (for example 88 and 108A) the amount of offset that is needed to bring the center point 80 of the compact disc in alignment, or coincidence, with the central axis of the print pattern is indicated. The lines 96 and 98 intersect or align with the lines 76 and 78 at "−3" on each side of the center point 80; and, by using this correction number and inputting it in the control computer 115, the stepper motor 58 for the printer will be stepped to bring the center point 80 into alignment in lateral (X axis) direction with the center point of the printing pattern when at rest. In the illustration of FIG. 4, the "−9" lines 90 and 110 intersect, and the −9 lines 78 and 98 intersect or are very closely adjacent, so the correction factor, indicating a −9 number is placed in the computer 115, and the stepper motor 30 is stepped along the Y axis (rod 38) to adjust the tray 14 to bring the CD center 80 into coincidence with the center of the printing pattern program along that axis.

The sets of lines are also printed with radial indicia marks to indicate the position adjacent the peripheral edge of the CD. For example, the set of the first printed lines may have short indicia marks 110A, 110B, 110C, and 110D adjacent to the periphery of the disc. These marks can be used for alignment with the point on the holding lever that engages the periphery of the CD to aid in rotating the CD 180° for the second printing. The second printing indicia marks are shown at 112A, 112B, 112C and 112D. Further, indicia marks adjacent the periphery can be printed into place adjacent to marks that are formed at the edge of the depression 20 on the tray for alignment purposes.

Figure 5:
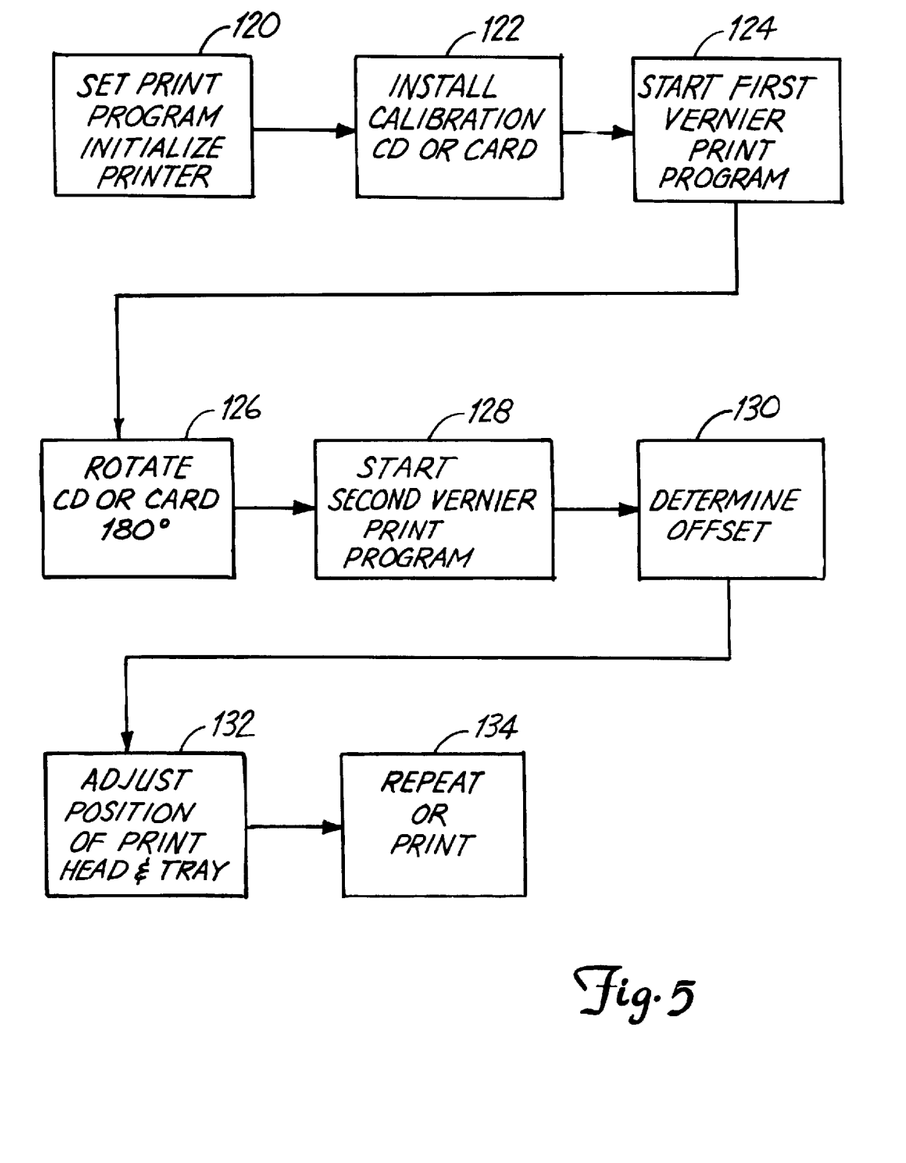
FIG. 5 is a block diagram representation of a method of determining correction for centering a CD on a printer support tray.

The process of centering the tray and print head relative to the position of the CD is made repeatable by the three-point edge engagement. The process is illustrated in FIG. 5. The first step is indicated at 120 and is to set the print program and initialize the printer for printing the calibration vernier indicia, including the lines and numbers for both printings.

Next, the calibration CD is installed on the tray, using the three-point centering arrangement. This is indicated at 122. The tray 14 is moved into printing position by operating the necessary controls shown generally at 118, and the print program starts to print the first printing of vernier lines on the CD as shown at 124. Then, the CD is turned 180° as indicated at 126 and the second printing of the second set of vernier lines is printed as shown at 128.

The amount of offset in at least one direction from the CD center is determined at 130. This is done visually, and then the next step is to adjust the position of the print head and/or tray as indicated, which is set forth in step 132. Selectively, the printing of labels can then be commenced as shown at 134, or if desired, a second check with a new calibration CD (or the opposite side of the first one) to see if the CD is now centered can be carried out by repeating the steps 122, 124, 126 and 128.

Adjustments can be made with printing only in one direction for calibration along one axis (positive Y direction for example). Adjustments in two directions can be made with printing in two directions from center (positive in both X and Y directions). The four direction printing disclosed is preferred.

The process of calibration for center alignment is applicable to most types of printers now used. The items should be made so they can be held in a repeatable position, either by being relatively rigid, or otherwise solidly clamped in a position repeatable with subsequent items.

Also, holders for rectangular cards can be adjusted to center the printer as well. The center or reference position on the card which should be aligned with the center or reference point of the print program is known. The center or reference position can be related to distances from the sides of the card. Edge location points can be provided to hold a polygonal card in a repeatable and releasable position. For example, projections in a recess at each side edge of a card can be used. One or more of the projections can be releasable, as shown in connection with a round disc at 24 and 26A.

The process is very straightforward, and provides for a readily usable, simple way of centering the program center on the card, CD or other printable item as it is retained in the mounting of a printer tray.

Although the present invention has been described with reference to preferred embodiments, workers skilled in the art will recognize that changes may be made in form and detail without departing from the spirit and scope of the invention.

What is claimed is:

1. A method of centering an item on which printing is to take place relative to a print program center when the item is held on a support that is movable on a first axis and a printer head for printing on the item is movable on a second axis perpendicular to the first axis, comprising the steps of:

placing the item on the support and retaining the item in printing position;

printing on the item a first printing of a series of spaced lines that are spaced radially outward in a direction along at least one axis from a center;

rotating the item substantially 180° and print at least in one direction along the same axis a second printing of a series of lines which are differently spaced radially than the spacing of lines printed in the first printing;

determining the position of substantial alignment of one first line and one second line; and moving at least one of the support and printer head in a direction along the axis a selected amount to a new start position as indicated by the position of substantial alignment of the one first line and one second line.

2. The method of claim 1 wherein the moving step comprises providing signals to a stepper motor for driving the at least one of the support and printer head based on the position where the one first line and the one second line substantially align.

3. The method of claim 1 including printing numerals adjacent each of the lines in the first and second printing.

4. The method of claim 3 including identifying a position in the series of lines which indicates alignment of the center of the item and a center of a program being in the center of the printed lines in radial direction.

5. The method of claim 1, wherein the step of printing on the item at the first printing and at the second printing comprises printing the series of spaced lines in directions along the at least one axis on both sides of the center.

6. The method of claim 1 including the step of printing at the first printing a third series of spaced lines that are spaced radially outward from the center in direction along a second axis perpendicular to the at least one axis, and at the second printing, printing a fourth series of lines along the second axis which are differently spaced from the third series of spaced lines printed along the second axis at the first printing.

7. The method of claim 6, wherein the first and second printing of lines along the second axis includes a series of third and fourth lines on both sides of the center for both the first and second printing.

8. The method of claim 1 wherein retaining the item in printing position includes providing on the support a plurality of individual spaced abutments for engaging a periphery of the item, at least one of said abutments being movable to engage the item under a resilient force and being releasably removable to permit a first item to be removed and subsequently replaced with a second item in substantially the same location against the abutments.

9. The method of claim 1, wherein said item is a disc shaped object having a generally round periphery, and wherein there are three abutments for engaging the round periphery on the support, one of the abutments being movable to resiliently engage and selectively disengaged from the periphery to thereby urge the disc like object against the other two abutments.

10. The method of claim 1, wherein the item is a flat item having a periphery, the support having abutments to engage the periphery of the flat item at locations to permit repeatable position placement of similarly shaped flat items on the support for retaining the item in printing position.

11. A method of centering a generally flat disc on which printing is to take place around a desired center of the disc, comprising providing a printer head movable in directions along a first axis and providing a disc support movable in direction along a second axis mutually perpendicular to the first axis;

mounting the disc on the support;

printing during a first printing on the disc a series of spaced first lines that are spaced radially outward in directions along both of the axes in at least one direction from the center along each axis;

rotating the disc 180° on the support and printing at a second printing a series of lines which are differently spaced radially than the spacing of second lines from the first printing in a direction along each axis and adjacent the lines printed in the first printing;

determining the position of alignment of a first line with a second line along each axis from the center; and moving the support and printer along said axes a selected amount as indicated by the position of alignment of the first and second lines spaced in direction alone each of the axes.

12. The method of claim 11 including the step of moving the printer and support in directions along the two axes by driving stepper motors, and providing signals to the stepper motors indicative of the position where the lines from along each of the axes from the first and second printings are most closely adjacent.

* * * * *

UNITED STATES PATENT AND TRADEMARK OFFICE
CERTIFICATE OF CORRECTION

PATENT NO. : 5,927,208
DATED : July 27, 1999
INVENTOR(S) : Erick Hagstrom et al.

It is certified that error appears in the above-identified patent and that said Letters Patent is hereby corrected as shown below:

Column 8, line 21, delete "alone", insert -- along--.

Signed and Sealed this

Nineteenth Day of December, 2000

Attest:

Q. TODD DICKINSON

*Attesting Officer*     *Commissioner of Patents and Trademarks*